(12) United States Patent
Cranor et al.

(10) Patent No.: US 6,911,947 B1
(45) Date of Patent: Jun. 28, 2005

(54) METHOD AND APPARATUS FOR REDUCING MULTIPATH DISTORTION IN A TELEVISION SIGNAL

(75) Inventors: Thomas Howard Bruce Cranor, Indianapolis, IN (US); Edward Allen Hall, Fort Wayne, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 357 days.

(21) Appl. No.: 10/069,332
(22) PCT Filed: Sep. 8, 2000
(86) PCT No.: PCT/US00/24708

§ 371 (c)(1),
(2), (4) Date: Feb. 22, 2002

(87) PCT Pub. No.: WO01/19075

PCT Pub. Date: Mar. 15, 2001

Related U.S. Application Data

(60) Provisional application No. 60/152,859, filed on Sep. 8, 1999.

(51) Int. Cl.[7] .................................................. H01Q 9/26
(52) U.S. Cl. ....................................... 343/741; 343/866
(58) Field of Search ............................. 343/741, 742, 343/866, 867

(56) References Cited

U.S. PATENT DOCUMENTS

| | | | | |
|---|---|---|---|---|
| 3,573,830 A | * | 4/1971 | Tadama et al. | 343/741 |
| 3,956,751 A | * | 5/1976 | Herman | 343/744 |
| 4,100,496 A | | 7/1978 | Akiyoshi et al. | 325/369 |
| 4,121,219 A | * | 10/1978 | O'Connor | 343/741 |
| 4,338,606 A | | 7/1982 | Tada et al. | 343/744 |
| 4,395,778 A | * | 7/1983 | Osada et al. | 455/276.1 |
| 4,397,041 A | | 8/1983 | Takeda et al. | 455/277 |
| 4,497,067 A | | 1/1985 | Namiki | 455/273 |
| 4,498,885 A | | 2/1985 | Namiki | 455/273 |
| 4,987,423 A | * | 1/1991 | Bouko et al. | 343/741 |
| 5,751,255 A | * | 5/1998 | Carter, Jr. | 343/866 |
| 5,784,032 A | | 7/1998 | Johnston et al. | 343/702 |

FOREIGN PATENT DOCUMENTS

| | | | | |
|---|---|---|---|---|
| DE | 3427629 | 1/1986 | | H01Q/1/38 |
| EP | 0221475 | 5/1987 | | H04N/5/21 |
| GB | 2257605 | 1/1993 | | H04B/7/08 |

* cited by examiner

*Primary Examiner*—Tho Phan
(74) *Attorney, Agent, or Firm*—Joseph S. Tripoli; Robert D. Shedd; Brian J. Cromarty

(57) ABSTRACT

The disadvantages associated with the prior art are overcome by a method and apparatus for reducing multipath distortion in a television signal. Specifically, a plurality of antenna elements receive spatially unique replicas of a desired television signal. The spatially unique replicas are coupled to an adaptive combiner, which generates a spatially combined signal to be coupled to a television receiver. The adaptive combiner forms a weighted summation of the spatially unique replicas, which effectively places spatial nulls in the direction of the multipath interference. The weighting information is provided by an adaptive controller that uses intelligence from a multipath processor located within the apparatus. The intelligence may take the form of a figure of merit derived from the combiner output, or from processing preformed on the input signals themselves.

10 Claims, 7 Drawing Sheets

METHOD AND APPARATUS FOR REDUCING MULTIPATH DISTORTION IN A TELEVISION SIGNAL

This application claims the benefit under 35 U.S.C. § 365 of International Application PCT/US00/24708, filed Sep. 8, 2000, which was published in accordance with PCT Article 21(2) on Mar. 15, 2001 in English; and which claims benefit of U.S. provisional patent application Ser. No. 60/152,859, filed Sep. 8, 1999.

The invention generally relates to method and apparatus for receiving a television signal, and more particularly, to an antenna system for adaptively reducing multipath distortion in a received television signal.

BACKGROUND OF THE INVENTION

Terrestrial television broadcast signals have long been plagued by multipath distortion. The transmitted television signal is reflected off of buildings and other large objects causing the reception of undesired multiple signals at the receiver. The undesired signals combine with the transmitted signal and produc what are commonly known as "ghost images" on the television screen. When receiving terrestrial digital broadcast television signals, such as high definition television (HDTV) signals, ghosting can completely prohibit image formation. Multipath distortion is particularly problematic in urban environments where a severe reduction in the amplitude of the received television signal can result due to interference nodes present in the incident fields. A small antenna of the type commonly found in urban environments can be completely enveloped in such a node, resulting in a loss of the television signal altogether.

Present techniques for removing multipath distortion in a television signal for both analog and digital television signal reception are based on adaptive equalization within the television receiver. Such techniques are only effective, however, in environments where mulitpath distortion is not too severe. In severe multipath environments, such as when multipath distortion results in a field node present at the antenna, present equalization techniques are insufficient to correct the distortion.

Therefore, there exists a need in the art for an antenna system that reduces multipath distortion in a television signal before the signal is coupled to the television receiver.

SUMMARY OF THE INVENTION

The disadvantages associated with the prior art are overcome by a method and apparatus for reducing multipath distortion in a television signal. Specifically, a plurality of antenna elements receive spatially unique replicas of a desired television signal. The spatially unique replicas are coupled to an adaptive combiner, which generates a spatially combined signal to be coupled to a television receiver. The adaptive combiner forms a weighted summation of the spatially unique replicas, which effectively places spatial nulls in the directions of multipath interference. The weighting information is provided by an adaptive controller that uses intelligence from a multipath processor located within the apparatus. The intelligence may take the form of a figure of merit derived from the combiner output, or from processing performed on the input signals themselves.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
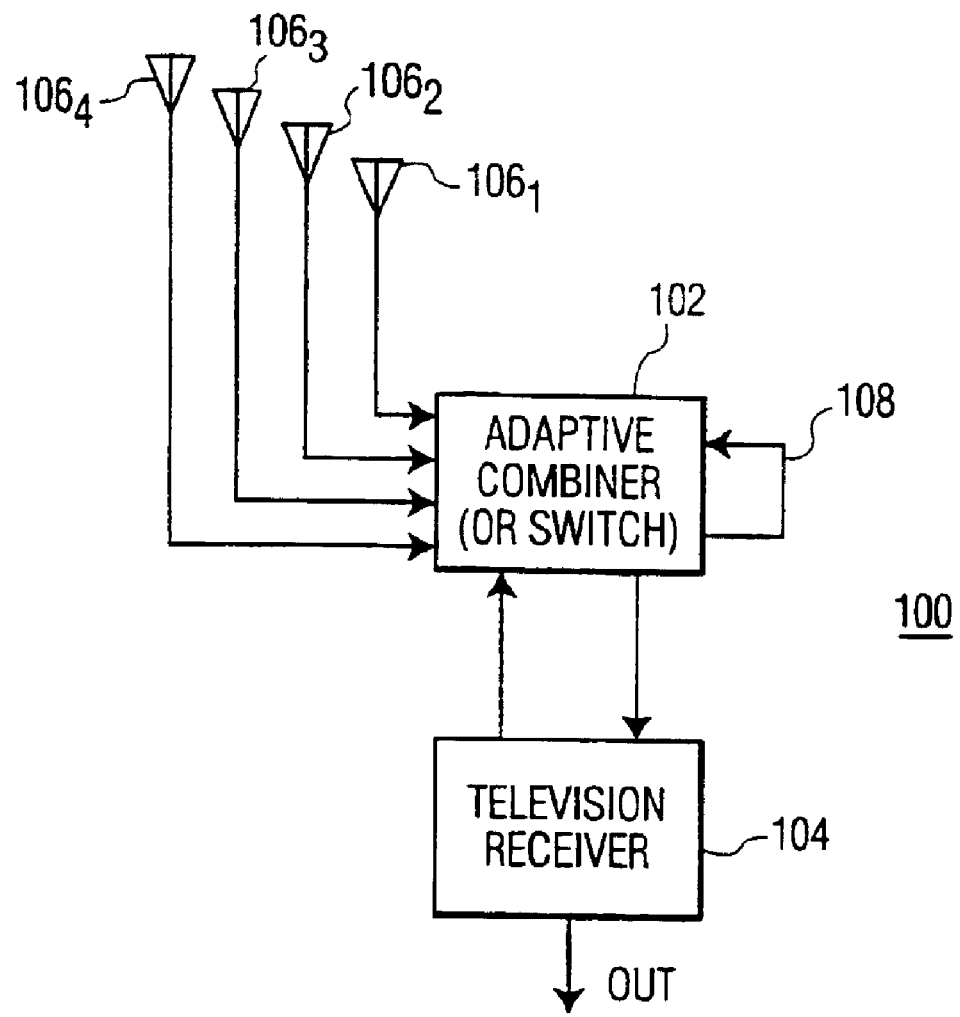
FIG. 1 depicts a block diagram of an apparatus in accordance with the present invention.

FIG. 1 depicts a block diagram of an apparatus 100 for reducing multipath distortion in a television signal. The apparatus 100 comprises a plurality of antenna elements 106 (e.g., four are shown), an adaptive combiner 102, and a television receiver 104. The antenna elements 106 receive an RF signal corresponding to a desired terrestrially broadcast television channel selected from a plurality of channel locations in a frequency band. The RF signals corresponding with broadcast channels are analog and digital television signals. The analog signal may comprise a conventional National Television Standard Committee (NTSC) modulated signal within the United States. The digital television signal may comprise a Vestigial Sideband (VSB) modulated signal in compliance with the Advanced Television Systems Committee (ATSC) standard A/53, for example, a high definition television (HDTV) signal. The system described herein could also be configured to function with other formats, such as European, by appropriate changes in the input section of the system.

Each antenna element 106 receives a spatially unique replica of the desired television signal (i.e., a replica of the television signal having a unique amplitude and phase associated with the angle of incidence). Each spatially unique replica is coupled to the adaptive combiner 102 for spatial processing. The adaptive combiner 102 generates a weighted summation of the spatially unique replicas that effectively places spatial nulls in the directions of multipath interference. The spatial processing of the adaptive combiner 102 is adaptive in that the (1) weighting information is generated using a figure of merit (FoM) 108 that is a measure of how well the apparatus 100 is operating, or (2) the weights are determined by direct processing of the input signals. The output of the adaptive combiner 102 is coupled to a television receiver 104 for demodulation and display of the television information.

Figure 2:
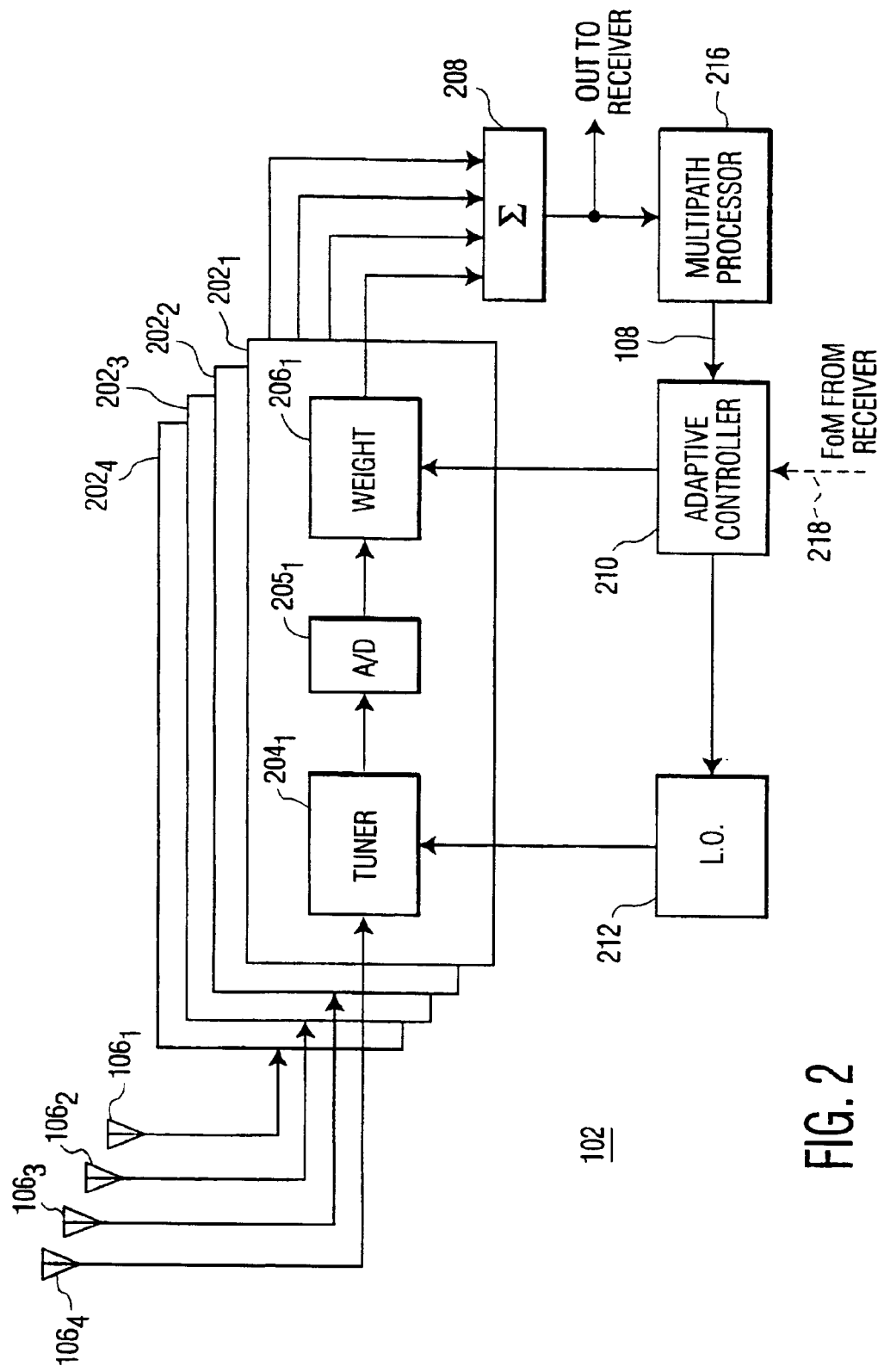
FIG. 2 depicts a block diagram of one embodiment of an adaptive combiner.

FIG. 2 depicts a block diagram of one embodiment of an adaptive combiner 102. The adaptive combiner 102 comprises a plurality of tuning modules 202, a summer 208, a multipath processor 216, an adaptive controller 210, and a local oscillator (LO) 212. Each of the plurality of tuning modules 202 comprises a tuner 204 and a weight 206. Each of the plurality of antenna elements 106 is coupled to a respective one of the plurality of tuning modules 202.

Specifically, with respect to tuning module $202_1$, the spatially unique replica of the desired television signal generated by antenna element $106_1$ is coupled to the tuner $204_1$. The tuner $204_1$ outputs an intermediate frequency (IF) signal corresponding to the desired television signal. The desired television signal is determined by the LO 212, which generates a LO signal having the appropriate frequency. The resulting IF signal is weighted by the weight $206_1$ and coupled to the summer 208. It should be recognized that the signal may be digitized (using digitizer $205_1$) at the output of the tuner, so that the adaptive processing may be performed mathematically.

Each of the plurality of tuning modules 202 operates in accordance with the above description causing a plurality of weighted spatially unique replicas of the desired television signal to be coupled to the summer 208. The summer 208 combines the plurality of weighted replicas to generate a spatially combined television signal. The spatially combined television signal is coupled to the television receiver 104 for demodulation and display of the television information as shown in FIG. 1. The format of the output from the combiner is chosen to be compatible with the receiver equipment. For example, the signal may be converted to the same frequency and modulation as originally sought by the TV. Alternatively it may be left as-is for a TV receiver that is appropriately configured.

The adaptive combiner 102 reduces multipath distortion in the desired television signal by appropriately adjusting each of the weights 206. Each weight 206 both adjusts the amplitude, and delays in time, the IF signal associated with the respective spatially unique replica of the desired television signal. Those skilled in the art could readily devise other forms for the weights, including, but not limited to, weighting both amplitude and phase, weighting amplitude only, weighting phase only, and performing a time delay only. One can also perform the weighting function directly on the RF signal, as is more typical of phased array antennas well known in the art. The choice is a matter of convenience in the chosen method of implementing the weights.

The adaptive controller 210 determines the value of each weight (i.e., the amount of amplification or attenuation and the amount of time delay) pursuant to an adaptive algorithm. In one embodiment of the invention, the adaptive algorithm utilizes a cross-correlation matrix that has the plurality of spatially unique replicas of the desired television signal as input. Specifically, the adaptive controller 210 selects a spatially unique replica, for example the replica generated by antenna element $106_1$, and computes a cross-correlation matrix between the selected replica and the remaining spatially unique replicas. Upon the determination that the desired television signal contains a multipath component, the adaptive controller 210 adjusts, for example, the weight $206_2$ corresponding to the spatially unique replica generated by antenna member $106_2$. The weight $206_2$ is adjusted so as to temporally align its respective spatially unique replica with the selected replica and to invert the detected multipath component. It should be recognized that the temporal delay need not be valued at the full measure of the delay between the direct and ghosted signals, but that essentially the same performance may be achieved by a delay period of the appropriate fraction of one RF period. This method, combined with a broadband inverter function (mathematical in the digital case or analog otherwise) will provide equally effective nulling in the direction of unwanted signals without the expense of the long tapped delay lines that would be required to capture the full delay time of the ghosted signal. This fact is one of the significant advantages of the present system versus an approach based solely on equalization, wherein full time delay is an absolute requirement.

When the summer 208 combines the two replicas, the multipath component is canceled from the desired television signal. In this manner, the adaptive controller 210 is able to cancel two more multipath components (for a total of three in the present embodiment) utilizing the spatially unique replicas from antenna members $106_3$ and $106_4$. In general, the apparatus 100 is able to cancel a number of multipath components which is one less than the number of antenna elements 106 (i.e., one less than the number of degrees of freedom). A larger number of multipath components may be addressed, with some compromise, by a least mean squares minimization of the total multipath energy. Those skilled in the art may readily devise other schemes for optimal weighting.

Alternatively, the performance at the combiner output may be used to derive a net figure of merit. In this case the adaptive process must blindly gravitate toward an optimat solution by gradient search-type algorithms well known in the literature.

The multipath processor 216 is coupled to the output of the summer 208 for analyzing the spatially combined signal to generate the FoM. The FoM depends upon the type of the signal being received (i.e., analog or digital). For NTSC signals, the FoM is based on an examination of various synchronous signals associated with the standard broadcast format. For digital signals, the multipath processor 216 calculates the signal-to-noise ratio. The FoM is output to the adaptive controller 210. In an alternative embodiment of the invention, the FoM could be derived from the receiver electronics according to a standardized protocol for such systems as shown by signal path 218.

In a lower cost alternative embodiment, the adaptive combiner 102 is reduced to a selector switch, which simply selects one of the available antenna ports for reception, while terminating the other ports with matched loads. The port selection process of such an embodiment could be based either on the same FoM as in the fully adaptive implementation, or simply on a memory look-up table of pre-arranged values selected by the user during a previous set-up mode of operation. Such a low-cost system lacks the gain and nulling performance of the fully adaptive system, but still provides substantially improved performance in the urban environment versus a simple static antenna.

Figure 3A:
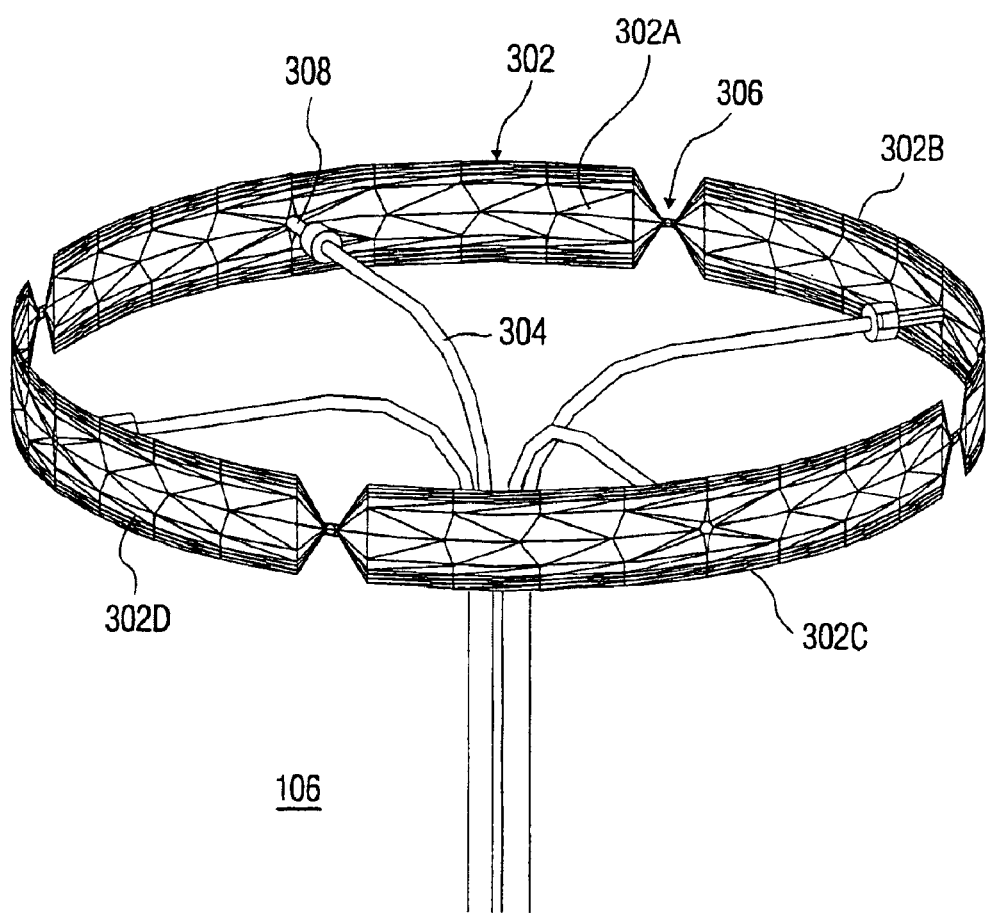
FIG. 3A shows a perspective view of a four-port loop antenna.

FIG. 3A shows a perspective view of an illustrative antenna 300 in accordance with the present invention. The antenna 300 is a multi-port loop antenna that is particularly well suited for use in an urban environment where signal strength is of less concern than multipath distortion. In one embodiment, the antenna 300 is a four-port loop antenna comprising a loop 302 formed from four flat strip conductors 302A, 302B, 302C, and 302D having four feed ports 306, and four feed lines 304 coupled to the loop 302 via mechanical couplers 308. The loop 302 has a circular cross-section and the feed ports 306 are disposed at 90° intervals on the perimeter of the loop 302. Each feed line 304 is mechanically coupled to the loop 302 midway between a respective pair of feed ports 306. The feed lines 304 extend radially inward from, and substantially to the center of, the loop 302. At the center of the loop 302, the feed lines 304 bend 90° at point 310 and extend away from the loop 302. The structure of the antenna 300 provides a convenient geometry for a supporting shell structure, making the design viable for set-top use.

The loop 302 is formed of foil, sheet metal, printed circuit board, or any combination thereof. In one embodiment, the loop comprises a conductive layer deposited upon, or otherwise attached to, a dielectric substrate 302S. The layer forms each of the conductive strips 302A, 302B, 302C, and 302D. Although FIG. 3A shows the loop 302 having a circular cross-section, those skilled in the art could readily devise alternative cross-sections. Furthermore, the loop may not be formed as a wide strip; however, the wide strip is practical and provides a substantially constant impedance over the broadcast frequency range. In another embodiment of the invention, the width of the strip conductor may also be oriented in the plane of the loop, as In an annulus.

Figure 3B:
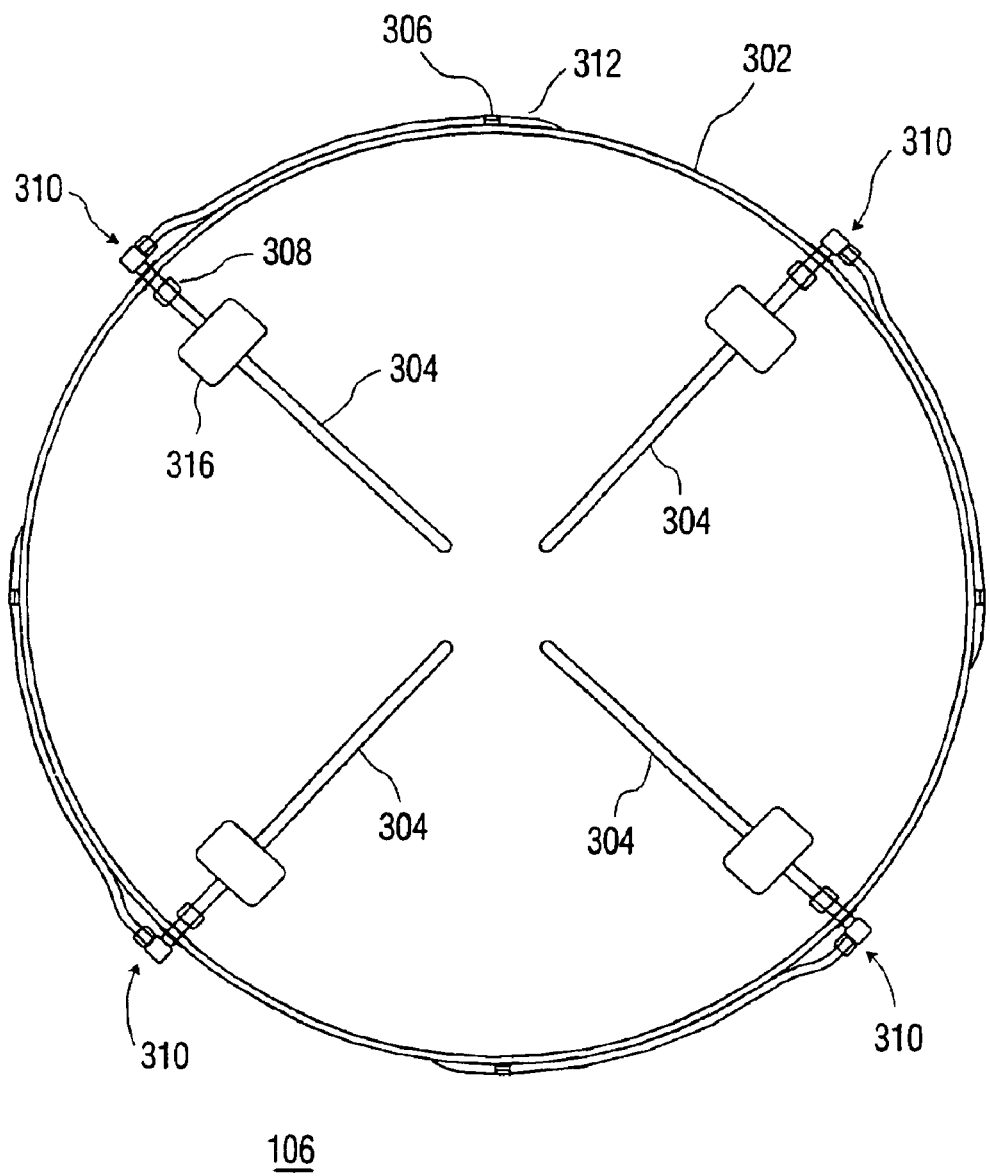
FIG. 3B shows a top view of a four-port loop antenna.
Figure 3C:
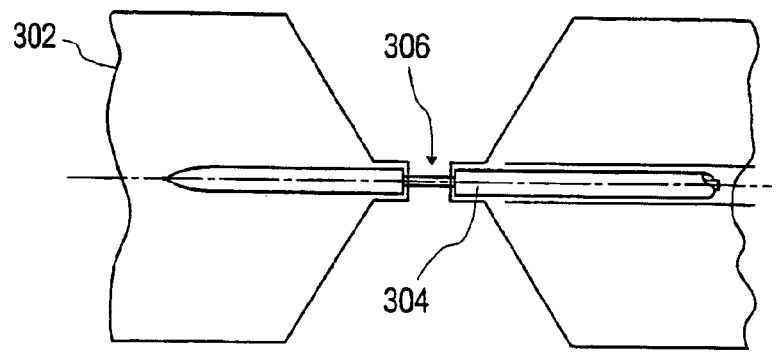
FIG. 3C shows a detailed side view of a feed port.
Figure 3D:
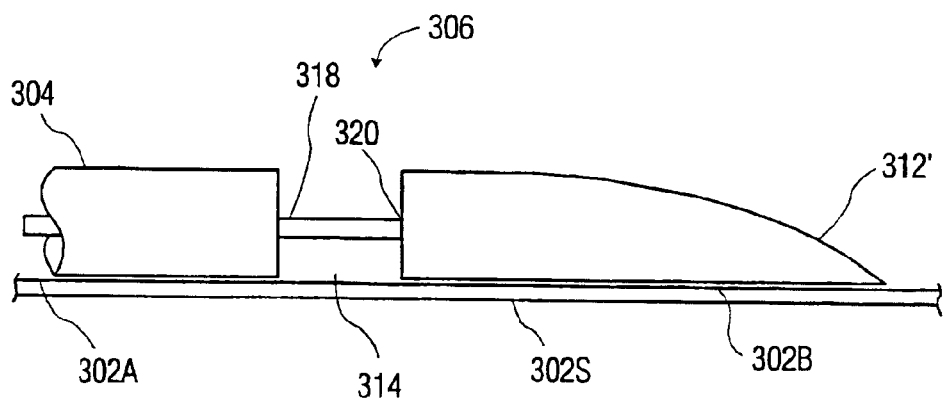
FIG. 3D shows a detailed top view of a feed port.

FIG. 3B shows the top view of the antenna 300. Each f ed line 306 bends 90° (at point 310) after the mechanical coupler 308 and extends along the perimeter of the loop 302. The coax shield of each feed line 306 is terminated on one side of a respective feed port 306 while the coax center conductor crosses the feed port 306 and joins a geometrically symmetric dummy coax structure 312 on the other side. FIG. 3C shows a close-up, side view of the structure of a feed port 306 and FIG. 3D shows a close-up, top view of the feed port 306. In the depicted embodiment, the loop 302 comprises a conductive layer 302A and 302B deposited upon an outer surface of a substrate 302S. The conductive strips 302A, 302B, 302C, and 302D are made narrow at each feed port 306 and a gap 314 (no conductor present) is formed between the conductive strips 302A, 302B of the loop 302 at the feed point 306. The feed lines 304 are coaxial cables, the shield of which is grounded to the loop 302 at the point where the feed line 304 is mechanically coupled to the conductive layer 302A of the loop 302. The narrow portion of the loop reduces stray reactance at those points, whereas the wider sections of the loop draw current away from the coaxial cables connections thereby reducing coupling to the feed lines 304. The increased width also acts to reduce the intrinsic reactance of the strip itself, thereby stabilizing the input impedance with respect to frequency. A width of at least two centimeters is needed to realize this effect. Alternatively a circular cross section conductor may be used, such as a wire or tube, with an outer diameter of at least one centimeter to achieve the desired stable impedance. As mentioned above, at each feed point 306, the center conductor 318 of the coaxial cable 304 spans the gap 314 and is grounded on the opposing side 320 of the gap 314 via the dummy coax 312. The coaxial cable 304 and dummy coax structure 312 form a self-balun.

Ferrite beads or sleeves 316 may be optionally placed around each feed line 304 to reduce coupling directly into the coaxial cables and reduce parasitic radiation by the coaxial cables.

Figure 3E:
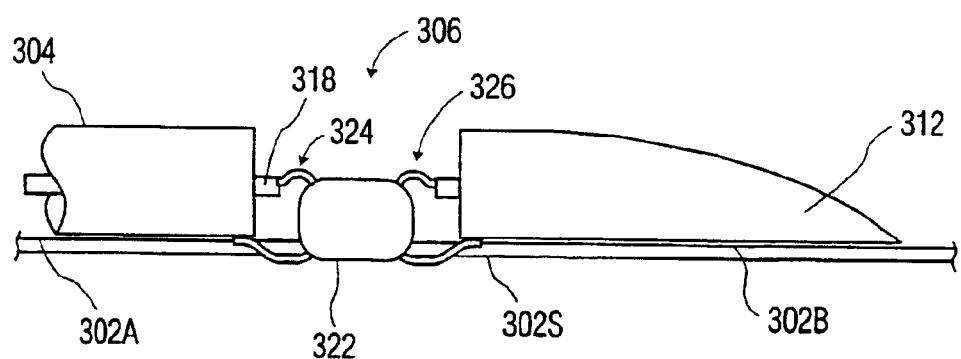
FIG. 3E shows a detailed top view of a feed port with a transformer.

As shown in FIG. 3E, impedance matching transformers 322 may be placed at the feed points 306, or at other points in the circuit, for improved matching to the tuner. Specifically, the matching transformer 322 has input terminals 324 coupled to the coaxial cable center conductor 318 and conductive strip 302A and has output terminals 326 coupled to the dummy coax structure 312 and the conductive strip 302B.

In an alternative embodiment of the invention, the transformer 322 is inserted at the mechanical coupler point. Thus the coax grounded the surface of the loop is replaced by a wire line which acts in conjunction with the conducting surface in the manner of a standard twin-lead transmission line wherein the strip conducting surface is situated on the plane of symmetry of such a line.

An alternative feed configuration for the antenna comprises a 300-ohm twin-lead transmission lines connected directly to the loop ports. The twin-leads would connect to in-line baluns at the hub of the loop. A classical Beverage antenna may be configured in this manner such that when the Beverage antenna is rotated to point directly at the signal source, the antennas single feed line would be oriented end-on to the incident field. As such, there would be little or no coupling to the feed line itself.

In another alternative feed structure, the transformer 322 can be positioned "in-line" at a location away from the feed point 306. As such, each of the coaxial cables 304 would terminate at a transformer 322 located, for example, at the bend point 310. Each transformer would be enclosed in a shielded housing. A high impedance coaxial cable (e.g., 300 ohms) would be used as the transmission line from the transformer to the feed point 306.

The antenna structure described in FIG. 3 is illustrative of that which can be used for the plurality of antenna members 106 as shown and described in FIGS. 1 and 2. Those skilled in the art could readily devise alternative arrangements of multiple antenna elements and/or multiport antennas. The multi-port loop antenna as herein described is particularly appropriate for use in urban environments where high gain is not as important as control of multipath distortion. Arrays of specifically targeted high gain elements, such as Yagi-Uda or log-periodic elements, can be used where more gain is required.

Figure 4A:
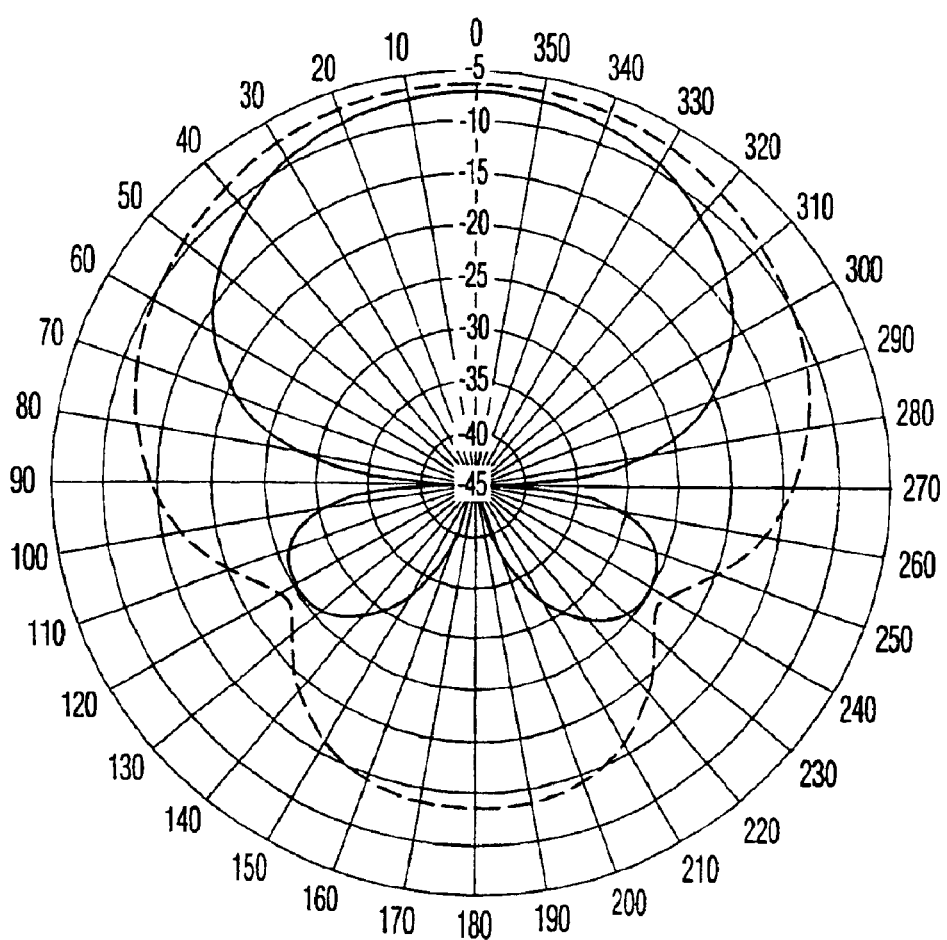
FIG. 4A illustrates basic and controlled radiation patterns of the present invention for low frequencies.

FIG. 4A d picts an illustrative radiation pattern obtained by the apparatus 100 of the present invention for low frequencies. The direction of the desired television signal is 0° and the directions of the multipath components are 90°, 180°, and 270°. In this example, the apparatus 100 forms pattern nulls at the multipath incident angles while maintaining gain in the desired signal direction.

Figure 4B:
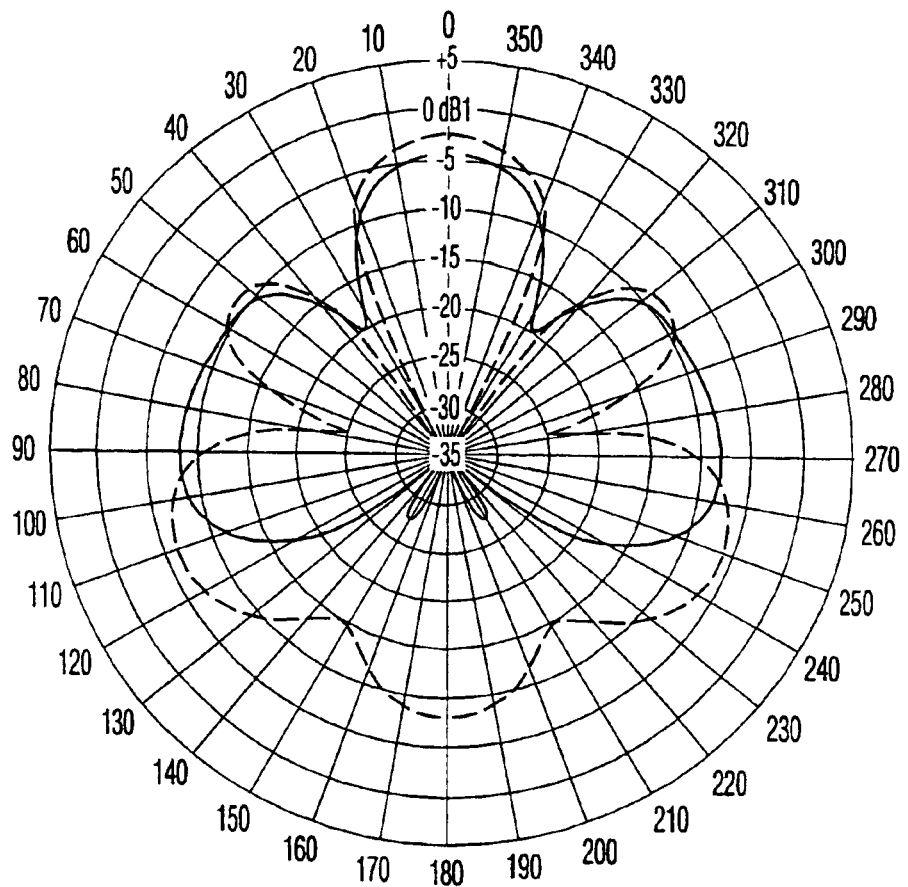
FIG. 4B illustrates basic and controlled radiation patterns of the present invention for high frequencies.

FIG. 4B depicts an illustrative radiation pattern obtained by the apparatus 100 of the present invention for high frequencies. Again, the direction of the desired signal is 0° but the directions of the multipath components are now 135°, 180°, and 225°. The apparatus 100 forms pattern nulls at the multipath incident angles while maintaining gain in the desired signal direction. For higher frequencies, the main lobe of the pattern becomes more directional than for lower frequencies.

Figure 5:
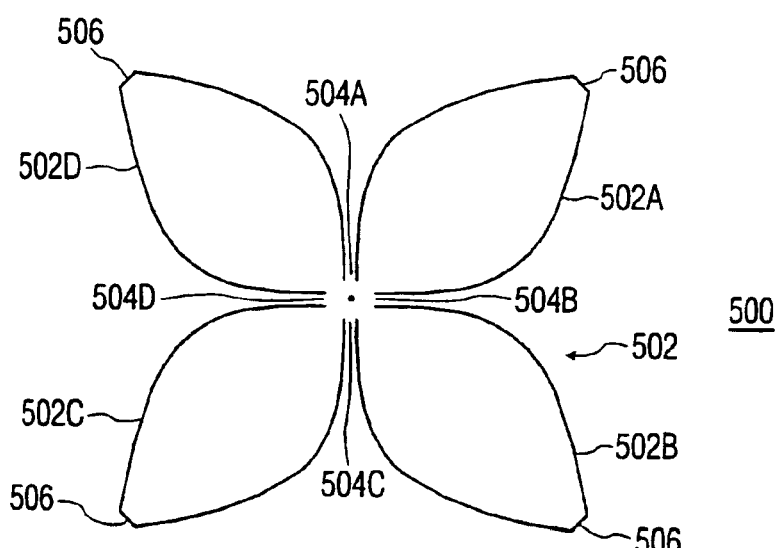
FIG. 5 illustrates the configuration of a clover antenna design.

FIG. 5 depicts an alternative embodiment of the antenna 500. The antenna 500 is a clover antenna comprised of a loop fo2 having four Vivaldi flared-notch antennas 502A, 502B, 502C, and 502D facing orthogonal directions. The loop 502, as a whole, operates in the VHF band as a modified, Beverage antenna, while the Vivaldi elements 502A, 502B, 502C, and 502D provide directional patterns in the UHF band. The elements may have a wider conductor along the flares to support the currents known to flow on the surface adjacent to the actual aperture on standard Vivaldi antennas.

As with the previous embodiment of the antenna, this alternative embodiment may be forms of wire, tubing, printed circuit board trace, foil, thin metal, and the like. The four-antenna element arrangement allows for selecting a particular antenna pattern. The pattern is selected by selecting a particular antenna port 504A, 504B, 504C or 504D. Each port provides a reception signal with unique amplitude and phase characteristics. Additional antenna patterns that are pointed at intermediate angles are possible by coupling the multiple antenna ports into a combining and phasing network.

The four Vivaldi elements 502A, 502B, 502C and 502D can be isolated from one another when not used in a loop configuration for VHF signal reception. Such isolation provides improved UHF pattern performance. The isolation can be provided by using mechanical relays, PIN diode switches, or a frequency selective circuit network between Vivaldi antenna element edges ( .g., at locations 506).

Although various embodiments which incorporate the teachings of the present invention have been shown and described in detail herein, those skilled in the art can readily devise many other varied embodiments that still incorporate these teachings.

What is claimed is:

1. An apparatus for reducing multipath distortion in a television signal, which comprises:

a plurality of antenna elements for receiving the television signal, wherein each of said plurality of antenna elements receives a respective one of a plurality of spatially unique signals, each of said plurality of spatially unique signals being a different replica of the television signal;

an adaptive combiner, coupled to said plurality of antenna elements, for generating a weighted spatially combined signal; and a receiver, coupled to said adaptive combiner, for demodulating said weighted spatially combined signal.

2. The apparatus of claim 1 wherein said plurality of antenna elements comprises a loop antenna having a plurality of feed ports, each of said plurality of feed ports being disposed around the perimeter of said loop antenna so as to receive a respective one of said plurality of spatially unique signals.

3. The apparatus of claim 1 wherein said adaptive combiner comprises:

a plurality of tuning modules, each of said tuning modules having a tuner and a weight for selecting a respective one of said plurality of spatially unique signals and generating a weighted spatially unique signal;

a summer, coupled to said weight of each of said plurality of tuning modules, for combining each weighted spatially unique signal to generate said spatially combined signal;

a multipath processor, coupled to said summer, for generating a figure of merit; and an adaptive controller, coupled to said multi path processor and said weight of each of said plurality of tuning modules, wherein said adaptive controller controls the value of each weight using an adaptive algorithm having said figure of merit as input.

4. The apparatus of claim 3 wherein said adaptive algorithm comprises a cross-correlation algorithm.

5. The method of claim 3 wherein said adaptive controller uses a manual user selection, stored in a memory.

6. A loop antenna comprising:

a plurality of conductive strips arranged in a circular pattern, where each strip comprises at least one narrowed portion;

a feed point connected to said at least one narrowed portion of each strip;

a signal coupler for connecting adjacent feed points and thereby coupling signals from said plurality of conductive strips.

7. The loop antenna of claim 6 wherein said signal coupler comprises:

a coaxial cable having a shield coupled to a first conductive strip and a center conductor spanning the gap and coupled to a dummy coaxial cable formed on a second conductive strip.

8. The loop antenna of claim 6 wherein said signal coupler comprises:

a impedance matching transformer.

9. The loop antenna of claim 6 wherein said plurality of conductive strips are formed upon a circular substrate.

10. The loop antenna of claim 6 wherein each of said conductive strips in said plurality of conductive strips forms a Vivaldi antenna element.

\* \* \* \* \*